April 6, 1948.  E. E. MOTT  2,438,926

MAGNETOSTRICTIVE SUPERSONIC TRANSDUCER

Filed Aug. 18, 1944   2 Sheets-Sheet 1

INVENTOR
E. E. MOTT
BY
Walter C. Kiesel
ATTORNEY

April 6, 1948.   E. E. MOTT   2,438,926
MAGNETOSTRICTIVE SUPERSONIC TRANSDUCER
Filed Aug. 18, 1944   2 Sheets—Sheet 2
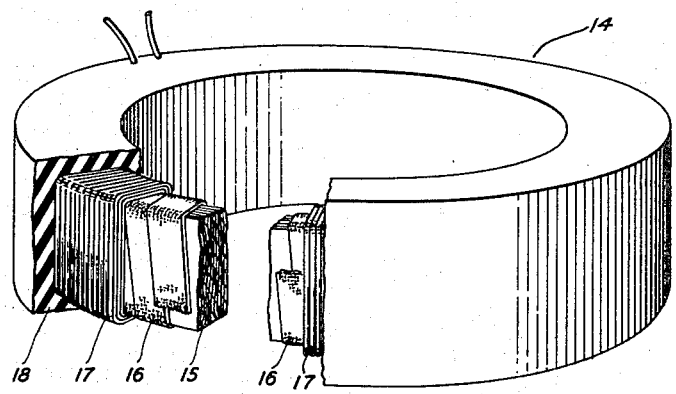
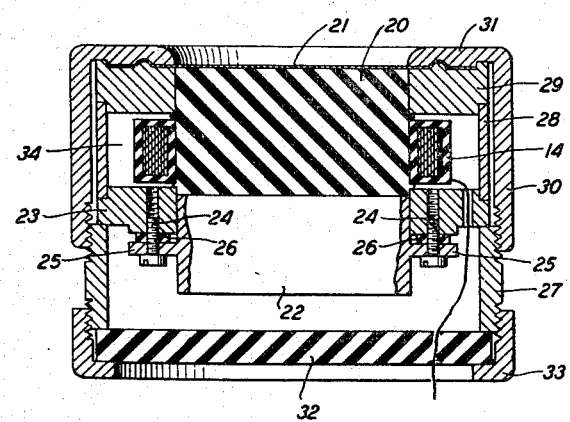
INVENTOR
E. E. MOTT
BY
Walter C. Kiesel
ATTORNEY Patented Apr. 6, 1948

2,438,926

UNITED STATES PATENT OFFICE 2,438,926

MAGNETOSTRICTIVE SUPERSONIC TRANSDUCER

Edward E. Mott, Upper Montclair, N. J., assignor to Bell Telephone Laboratories, Incorporated, New York, N. Y., a corporation of New York Application August 18, 1944, Serial No. 549,970

8 Claims. (Cl. 177—386)

This invention relates to submarine signaling devices and more particularly to supersonic submarine signaling devices of the magnetostrictive type.

One general object of this invention is to improve the operating characteristics of magnetostrictive transducers and more particularly of supersonic submarine signal projectors and receivers comprising such transducers. More specific objects of this invention are to:

Increase the efficiency of magnetostrictive devices as converters of electrical energy into compressional wave energy or vice versa;

Substantially prevent vibration of magnetostrictive transducers in parasitic modes within a wide range of frequencies;

Increase the safe permissible range of operating temperatures for such transducers;

Obtain highly directional propagation and reception patterns for submarine signaling devices comprising a plurality of electromechanical translating elements;

Increase the operating load capacity of supersonic submarine signaling devices of the magnetostrictive type; and Simplify the construction of such devices.

In one illustrative embodiment of this invention, a supersonic submarine signaling device comprises a plurality of magnetostrictive elements arranged to define in combination an equivalent propagating or receiving blanket generally diamond-shaped in outline, each element being annular, having its inner annular surface in contact with the signal conveying mechanism, e. g. fluid, and constructed to vibrate radially in response to energization by signaling currents or compressional waves.

In accordance with one feature of this invention, each of the magnetostrictive elements comprises a core of magnetostrictive material formed of wound tape of very small thickness such that the conversion efficiency of the core as a transducer closely approaches the ideal efficiency, the ideal efficiency being unity ratio of total integrated acoustic power over a complete sphere to electrical power.

In accordance with another feature of this invention, each element is so constructed and arranged that its natural period of vibration corresponds substantially to the mid-frequency in the intended operating band of the device and the core thereof is cast or molded integral with a body which reinforces the core against parasitic vibratory modes. In accordance with a more specific feature of this invention, the body comprises a plastic, such as a phenolic condensation product, having fine metal dust, for example of copper, dispersed therethrough, whereby thermal gradients through the element, such as occur during the molding of the element or use of the device, are reduced and cracking of the body with consequent degradation of the operating characteristics of the element is prevented.

In accordance with a further feature of this invention, the several magnetostrictive elements are arranged so that only the inner annular surface thereof acts upon, or conversely is acted upon, by the volume of fluid encompassed thereby and means are provided for sonically insulating the elements laterally from one another, whereby interference effects are minimized and uniform directional patterns for the device are realized.

In accordance with still another feature of this invention, each element has associated therewith a backing plate constituting with a portion of the medium encompassed by the element a longitudinally vibrating transmission element of a length substantially equal to a quarter wavelength of the mid-frequency in the intended operating range of the device and having a node, at this frequency, substantially in the median transverse plane of the magnetostrictive element, whereby substantially optimum transmission of energy to the medium, or vice versa, is realized.

In accordance with still another feature of this invention, the magnetostrictive elements are made of such diameter and are arranged in rows so spaced that sharply directional patterns, for propagation and reception, in all directions are obtained for the device.

The invention and the above-noted and other features thereof will be understood more clearly and fully from the following detailed description with reference to the accompanying drawings, in which:

Fig. 3 is a perspective view of one of the magnetostrictive elements included in the device illustrated in Figs. 1 and 2, portions of the element being broken away to show the construction thereof;

Fig. 4 is an elevational view mainly in section of a signaling device illustrative of another embodiment of this invention.

Figure 1:
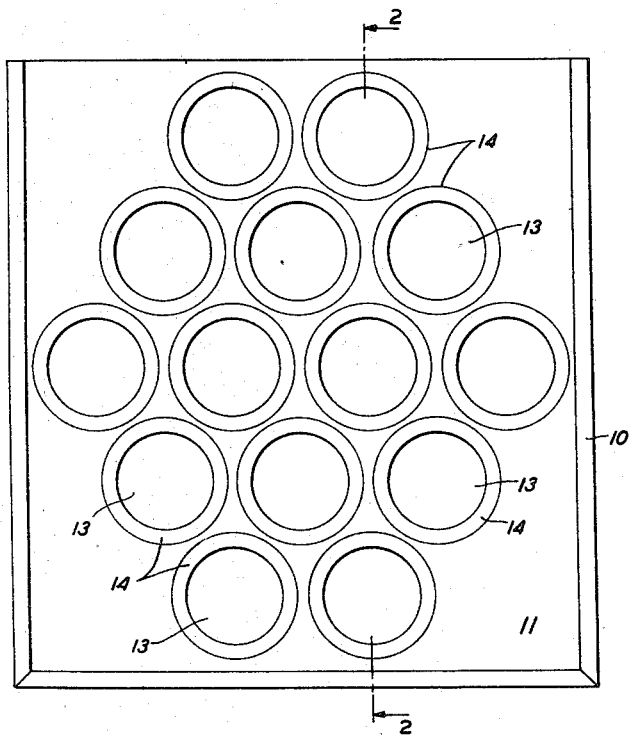
Fig. 1 is a front elevational view of a submarine signaling device illustrative of one embodiment of this invention.
Figure 2:
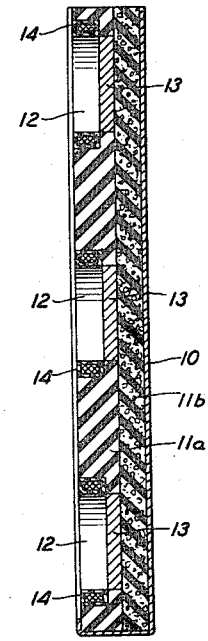
Fig. 2 is a side view in section along plane 2—2 of Fig. 1.

Referring now the drawings, the submarine signaling device illustrated in Figs. 1 and 2 is suitable for use both as a supersonic compressional wave receiver and projector and comprises a mounting member or support 10, for example of metal, carrying a substantially square body or block 11, which may be composed of two layers, 11a and 11b, as illustrated in Fig. 2, of compressional wave energy insulating material. For example, the body may be of a cellular material, such as a mixture of cork and rubber known commercially as "Corprene," characterized by substantial entrapped air pockets and high attenuation of compressional wave energy therethrough. The body 11 is provided with a plurality of circular recesses 12 in generally diamond-shaped array as shown in Fig. 1, at the base portion of each of which there is seated a circular metallic, for example lead, backing or resonator plate or disc 13. Each recess has fitted therein a circular magnetostrictive transducer unit or element 14, the inner end of which is coplanar with the respective plate or disc 13 and the outer end of which is coplanar with the front face of the body 11.

The several units 14 are substantially identical and each unit, as shown clearly in Fig. 3, comprises an annular magnetostrictive core 15 having a fabric tape 16 covering thereon and a signal coil 17 wound over the covering 16. The core is impregnated with a suitable material, such as a phenolic condensation product, and the coil, core and covering are molded or cast in a plastic insulating body 18 having particular characteristics as set forth hereinafter.

In use, the signaling device is mounted vertically and submerged in the sea and carried within a housing, such as disclosed in the application, Serial No. 493,177 filed July 2, 1943, of Arthur C. Keller, Patent No. 2,417,830, granted Mar. 25, 1947, which is filled with a substantially air free fluid such as deaerated water or a liquid, e. g. castor oil, having substantially the same characteristics for the transmission of supersonic compressional wave energy as sea water, and which is provided with a sonically transparent window opposite the front face of the device. The cores 15 of the units are polarized circularly and, when the device is utilized as a projector, the coils 17 are energized, for example in series, with suitable signal currents. When the coils are thus energized, each transducer unit 14 vibrates radially and the radial motion is converted into corresponding pressure variations in the body of liquid within the confines thereof, normal to the outer face of the body 11, in the medium in which the device is immersed. Substantially all radiation from the units occurs at the inner annular surfaces thereof, the body 11 because of its character as described hereinabove sonically insulating the several units laterally from one another and suppressing radiation laterally outward from the units and also rearwardly from the units, that is to the right in Fig. 2.

The operating characteristics, such as the efficiency, frequency range and directional pattern of the device are dependent to a large extent upon several dimensional parameters and relations thereof. Basically each unit 14 is constructed mechanically so that its natural period as a radially vibrating element is substantially the same as the mid-frequency in the band of frequencies to be translated by the device and the outer diameter of each unit is made substantially equal to one wavelength, in sea water, of this frequency. The resonant frequency of radial vibration of the core 15 is determined uniquely by the mean core diameter and is expressed by the relation $$f_0 = \frac{1}{\pi D_m}\sqrt{\frac{E}{\delta}}$$

where $f_0$=the resonant frequency $D_m$=the mean core diameter
$E$=Young's modulus for the core material, and
$\delta$=the density of this material The resonant frequency of the annular unit as a whole will differ somewhat from, being generally lower than, that for the core as given by the above equation due to the mass loading effect of the coil 17 and body 18. However, the absolute magnitude of this effect can be determined readily. In a specific construction of unit intended for operation over a 6-kilocycle band with a mid-frequency of 25 kilocycles and wherein the body 18 was $\frac{1}{16}$ inch thick and of a phenolic condensation product, the coil 17 was of 200 turns of No. 24 copper wire and the core was of an alloy having a density of approximately 8.2 and a Young's modulus of approximately $24 \times 10^{11}$ in centimeter-gram-second units, a core designed to have a resonant frequency of approximately 31 kilocycles was found to produce a resonant frequency of substantially 25 kilocycles for the unit as a whole.

Although, as appears from the above equation, the axial height and radial thickness of the unit do not affect materially the resonant frequency, these parameters do no enter into the determination of the mechanical impedance and the radiation resistance of the unit. In a particular unit intended for operation in the frequency range noted above and of the construction described in the preceding paragraph, a core of $\frac{3}{8}$-inch axial height and a radial thickness of substantially 0.2 inch has been found to result in a satisfactorily high ratio of mass reactance to resistance for the unit.

The axial height of each unit 14 and the thickness of the backing plate or disc 13 are important parameters in the determination of the efficiency of the device. The body of fluid within the confines of each unit constitutes a longitudinally vibratile wave transmitting body coupled at one end to the backing plate and at the other end to the wave transmitting medium in which the device is immersed. It has been found that the backing plate substantially increases the efficiency of the device and that maximum efficiency is obtained when the unit is of such axial height and the plate of such thickness that the distance between the rear face of the backing plate and a transverse plane substantially midway between the ends of the unit is substantially equal to one-quarter wavelength of the mid-frequency in the operating range of the device. In a particular construction, the provision of the backing plate results in a gain in efficiency of at least 1.5 decibels over a construction without such plate. In a specific device of the construction described heretofore, the axial height of the unit may be $\frac{15}{16}$-inch and the thickness of the lead backing plate may be 0.250-inch to produce the quarter wavelength relation noted above, whereby a vibrational node for the body of fluid within the core is produced at the median transverse plane noted.

Figure 5:
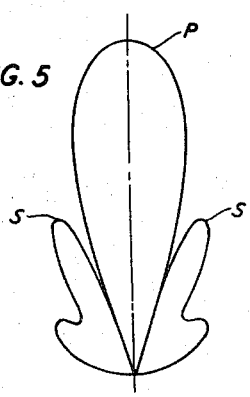
Fig. 5 is a typical directional pattern of a device of the construction illustrated in Figs. 1 and 2.

As pointed out hereinabove, the outside diameter of each unit advantageously is substantially equal to the wavelength corresponding to the mid-frequency in the intended operating band of the device. This dimension and the center-to-center spacing of the units are principal factors determining the directional pattern for the device. The arrangement of units illustrated in Fig. 1, it will be seen, comprises horizontal and vertical rows of units, the units in adjacent rows being in staggered relation whereby a high space factor is obtained. It has been found that maximum directionality for such arrangement is realized when the spacing between center lines of adjacent rows of units is substantially a half wavelength corresponding to the mid-frequency in the operating band of the device. A typical directional pattern for the device illustrated in Fig. 1 is shown in Fig. 5, this pattern being for radiation in a horizontal plane passing through the center line of the middle horizontal row of units. In a specific construction, the amplitude of the greatest secondary lobes S was substantially 20 decibels below the amplitude of the primary lobe P. For the arrangement shown in Fig. 1, the directional pattern for vertical and intermediate planes is similar to that for the horizontal plane, as illustrated in Fig. 5.

As noted heretofore, each of the units 14 vibrates radially when signal currents are supplied to the coils 17 thereof. It is obviously highly desirable that the unit vibrate uniformly radially and be free of parasitic vibrational modes, at least throughout the intended operating band of the device, to prevent degradation of the directional pattern. The body 18 in which the core and coil are cast serves to reinforce the core against parasitic vibrations. Plastics, and particularly phenolic condensation products, are particularly suitable for use as materials for the body. Two difficulties, however, are encountered in the use of such materials. Because of the different thermal coefficients of the core and the body materials, fine cracks may appear in the unit during cooling after the casting thereof or during operation of the device and such cracks result in irregularities in the directional patterns. Also, small air pockets may appear in the body or between it and the coil and, air being a relatively poor conductor of supersonic compressional wave energy, result in a decrease in the efficiency of the device. To prevent the appearance of such cracks, fine metal dust is thoroughly dispersed throughout the body material while it is highly plastic, the percentage of dust being such as to prevent substantial decrease of the insulation resistance of the body by particle to particle contact of the dust. A particularly satisfactory body composition is one of a phenolic condensation product having approximately twenty-five per cent fine copper dust dispersed therethrough, the core and coil being molded in the body material at high pressure, of the order of two tons. The copper, having high thermal conductivity, greatly reduces the thermal gradient through the body so that during the cooling period after casting of the unit the formation of cracks is prevented. Also, because of the low thermal gradient thus realized, formation of cracks during use of the device due to large temperature variations is prevented. The high pressure molding reduces entrapped air in the unit to a minimum and thus prevents degradation of efficiency of the unit by such air.

The efficiency of a magnetostrictive unit as a transducer of supersonic compressional wave energy into electrical energy and vice versa is determined largely by the construction and electrical and magnetic characteristics of the core. It has been found that certain factors are particularly important in the determination of the efficiency of a core and that by following certain considerations, pointed out in detail hereinafter, exceptionally high efficiencies, of the order of 90 per cent or higher, for the core can be realized.

Of course, in order to reduce eddy current losses, it is known that the core should be laminated. In a particularly advantageous construction, the core, such as illustrated in Fig. 3, is tape wound, adjacent turns being insulated from one another as by silica dust cataphoretically applied, for example as disclosed in the application, Serial No. 391,302, filed May 1, 1941, of Kenneth W. Compton and Harold L. B. Gould, now abandoned.

It has been found that the efficiency of the core as a transducer is dependent to a very large extent upon the thickness of the laminations, that is the thickness of the tape in a wound coil of the particular construction disclosed, and that there is a limited range of thickness for which high efficiencies can be realized. As a specific example, for a tape wound core of an alloy of 45 per cent nickel and balance iron or predominantly iron, and operated at optimum flux density, approximately 12,000 gauss, the conversion efficiencies at 25 kilocycles, expressed in decibels below ideal, for tape thickness of 30, 14 and 6 mils are about 10, 8.2 and 6 decibels respectively, the efficiency at 6 decibels corresponding to about 25 per cent. For tape thicknesses of 4 mils, 2 mils and 1 mil, the efficiencies are respectively 2.25, 1.5 and 1 decibel, the latter corresponding to an efficiency of about 82 per cent.

It will be seen that for tape thicknesses of 6 mils or more, the cores are inefficient when used as transducers and that a great increase in efficiency is attainable by decreasing the tape thickness. The greatest increase in efficiency per unit decrease in thickness is obtained between thicknesses of about 6 mils and 4 mils. Specifically, in this range the absolute increase is approximately 22.5 per cent per mil decrease in thickness. For decreases in thickness below 4 mils, the rate of increase in efficiency is less, the absolute increase in efficiency being of the order of 12 per cent for a decrease in tape thickness from 2 mils to 1 mil. Practical considerations, principally the matter of fabricating, handling and winding thin tapes and the increased tendency of thinner tape cores to vibrate in parasitic modes, must be taken into account in the design of any particular magnetostrictive core. Highly efficient cores having freedom from parasitic vibrations in the operating range from 22 to 28 kilocycles have been constructed of both 1 and 2-mil tapes of the composition specified above. For tape thicknesses below 1 or 2 mils, the gain in efficiency is relatively small and counteracted, for practical purposes, by the increased difficulties of handling the tape and the tendency toward parasitic vibrations.

Another specific example showing the importance of the tape thickness in affecting the efficiency of a tape wound core as a magnetostrictive transducer, is such a core the tape of which was composed of an alloy of 49 per cent iron, 49 per cent cobalt and 2 per cent vanadium. For cores of this material operated at substantially optimum flux density, the efficiencies for various thicknesses are given by the following table:

| Thickness, Mils | Efficiency, Per Cent |
|---|---|
| 12 | 17.2 |
| 6 | 77.3 |
| 4 | 81.7 |
| 2 | 88 |

As in the case for the first alloy noted above, it will be seen that for the second alloy the ideal efficiency is approached for core lamination thickness of approximately 2 mils. Investigations of a variety of other magnetostrictive materials have demonstrated that the realization of high conversion efficiencies for the core as a transducer requires that the tape or lamination thickness be no greater than about 4 mils and most advantageously 2 mils or less.

It has been discovered that the second core material noted above, that is, an alloy of 49 per cent iron, 49 per cent cobalt and 2 per cent vanadium, can be made to exhibit exceptionally advantageous characteristics for use in magnetostrictive transducers. More particularly, it has been found that such alloy hydrogen annealed at between 550° and 600° C. for about 2 hours is characterized by unusually high remanence and coercive force and that a core thereof has a high resistivity, high magnetostriction constant and also a substantially constant conversion efficiency over a wide range of demagnetizing forces. In a specific construction, a core designed for use in a transducer having a 6-kilocycle operating band with a mid-frequency of 25 kilocycles and of 2-mil tape of the alloy noted annealed at about 550° C. has been found to have a remanence of about 18,000 gauss, a coercive force of about 18 oersteds, and a conversion efficiency constant within about 3 per cent for demagnetizing forces up to about 17 oersteds. By comparison, a core of similar construction and the same material annealed at 800° C. has a coercive force of about 3 oersteds, has a maximum conversion efficiency about 10 per cent below that for the first core and the conversion efficiency falls off rapidly with increasing demagnetizing force, decreasing approximately 15 per cent for a demagnetizing force of 2.5 oersteds and falling off abruptly for further slight increases in this force.

It will be appreciated that magnetorestrictive cores of this material treated as described require only small auxiliary direct current polarizing flux for efficient operation and may, in fact, be operated at remanence without any separate direct current polarizing source, such as permanent magnets or biasing current source. Thus, simple constructions for transducers and high overall efficiencies are realized. It will be appreciated further that because of the high coercive force of the material and substantial constancy of efficiency over a wide range of demagnetizing forces, transducers having cores constructed thereof are capable of propagating and receiving high power signals without distortion.

In the embodiment of the invention illustrated in Fig. 4, the radially vibratile magnetostrictive element 14, which may be identical in construction with that illustrated in Fig. 3, acts upon a cylindrical block or body 20, such as commercially available forms of rubber, having substantially the same characteristics as sea water for transmission of supersonic compressional wave energy, the radial vibrations of the element 14 being converted into longitudinal vibrations of the body 20, that is in the direction of the axis of the element 14. The block or body 20 has one end in engagement with a diaphragm 21, for example of metal, and its other end intimately engaged by a backing block or resonator 22, for example of lead. The backing block or resonator 22 is fitted slidably within a support 23 and affixed thereto by a plurality of screws 24 extending through flanges 25 on the block and threaded into the support 23, resilient take-up washers 26 being interposed between the flanges 25 and support 23.

The support 23 is seated upon a cylindrical shell 27 and is clamped thereagainst, together with a cylindrical spacer 28 and annular plate 29, by a cap 30 which is threaded to the shell 27 and provided with a flange 31 overlying and bearing against the peripheral portion of the diaphragm 21. In the assembly of the device, the support 23, spacer 28, plate 29 and diaphragm 21 are clamped together by the cap 30, with the block 20, resonator 22 and element 14 in position. The screws 25 are then manipulated to force the backing block 22 against the body 20 whereby the body is forced into intimate contact with the diaphragm 21 and element 14. Consequently, air pockets between the body 20 and the diaphragm and magnetostrictive element are substantially eliminated and efficient transfer of energy from the element 14 to the medium, e. g. sea water, into which the diaphragm radiates, or conversely from the medium to the element, is realized. The lower end of the casing may then be sealed, as by a closure 32, clamped against the shell 27 by a clamping ring 33 threaded to the shell.

It will be noted that in the completed device an air chamber 34 is provided around the magnetostrictive element 14. Such chamber constitutes an insulator for supersonic compressional wave energy so that energy radiated outwardly from the element is greatly attenuated, and conversely energy flow inwardly to the element from the medium in which the device is immersed is greatly attenuated. Thus, substantially all transmission of energy from the element to the medium, or vice versa, is from or to the inner annular surface of the element 14 by way of the body 20, whereby sharp directionality may be realized.

The dimensional parameters of the element 14 in the device shown in Fig. 4 are related to the operating wavelength in the same manner as in the device shown in Figs. 1 and 2 and described heretofore, for most advantageous operation. Also, the body 20 is so constructed and arranged that the distance between the end thereof in contact with the resonator block 22 and the median transverse plane of the element 14 is substantially equal to one-quarter wavelength of the mid-frequency in the operating band of the device, and the resonator block 22 is of a thickness substantially equal to one-quarter this wavelength, whereby a vibrational antinode is established at the plane of the contacting surfaces of the body 20 and the block 22.

A plurality of units of the construction illustrated in Fig. 4 may be mounted upon a common support, arranged as the elements in Fig. 1 to provide a high power highly directional projector or receiver. In such construction, the air chambers 34 in the several units insulate the units laterally from one another and prevent degradation of the directional pattern by interference effects between units.

In a multiunit signaling device, the several magnetostrictive elements may be operated electrically in series as noted heretofore. Alternatively the several units may be operated in parallel or in various series-parallel combinations. For example, some improvement in the suppression of minor secondary lobes in the directional pattern for the horizontal plane may be obtained for a device wherein the elements are arranged as in Fig. 1, by connecting the end elements in the middle horizontal row in parallel whereby the power radiation from each of these elements is one-half that for the other elements.

Reference is made of the application Serial No. 549,972, filed August 18, 1944, of Hubert K. Krantz wherein a related invention is disclosed.

Although specific embodiments of the invention have been shown and described, it will be understood that they are but illustrative and that various modifications may be made therein without departing from the scope and spirit of this invention as defined in the appended claims.

What is claimed is:

1. A submarine signaling device comprising a plurality of substantially identical, circular, radially vibratile magnetostrictive elements arranged in rows to define a substantially diamond-shaped blanket, the longitudinal axes of said elements being substantially parallel and the inner annular faces of said elements being exposed in energy transferring relation to a compressional wave transmitting medium, the elements in adjacent rows being in staggered relation, and compressional wave energy insulating means between the outer annular faces of contiguous elements, each of said elements being of a diameter substantially equal to one wavelength of a preassigned frequency and the distance between center lines of said rows being substantially equal to one half said wavelength.

2. A supersonic submarine signaling device comprising a plurality of annular radially vibratile magnetostrictive transducer units adapted to be immersed in a fluid medium with their inner annular surfaces exposed to said medium, said units being arranged adjacent one another and with the longitudinal axes thereof substantially parallel, and supersonic compressional wave attenuating means surrounding the outer annular surface of each of said units.

3. A magnetostrictive transducer comprising a magnetostrictive core and a body in which said core is cast, said body comprising a plastic having fine metal dust dispersed therethrough.

4. A magnetostrictive transducer comprising a radially vibratile magnetostrictive core, and a covering on said core and intimately joined thereto, said covering comprising a plastic having of the order of 25 per cent metal dust dispersed therethrough.

5. A magnetostrictive transducer comprising an annular, radially vibratile magnetostrictive core, and a coating on said core and intimately joined thereto, said coating being composed of a phenolic condensation product having of the order of 25 per cent copper dust dispersed therethrough.

6. A supersonic submarine signaling device comprising an annular, radially vibratile magnetostrictive element, a compressional wave transmitting body encompassed by said element and intimately contacted by the inner annular surface thereof, and means constituting with a portion of said body a compressional wave transmission element vibratile in the direction of the axis of said magnetostrictive element and having a vibrational node in substantially the median transverse plane of said magnetostrictive element normal to said axis.

7. A supersonic submarine signaling device adapted to be immersed in a fluid during use, comprising an annular, radially vibratile magnetorestrictive element having its inner surface exposed for contact with the fluid, and a plate member adjacent one end of said element and of such thickness as to constitute with a portion of the fluid body encompassed by said surface a quarter wavelength resonator at a preassigned supersonic frequency, having a vibrational node substantially in the median transverse plane of said element normal to the axis of said element.

8. A supersonic submarine signaling device adapted to be immersed in a fluid during use, comprising a block of compressional wave insulating material having a cylindrical recess therein, an annular radially vibratile magnetostrictive element within said recess, coaxial therewith and having its inner annular surface exposed for contact with said fluid, and a metallic disc between the base of said recess and the inner end of said element, said disc being of such thickness as to constitute with the body of fluid between it and the transverse median plane of said element a longitudinally vibratile body one quarter wavelength of a preassigned frequency in length.

EDWARD E. MOTT.

REFERENCES CITED

The following references are of record in the file of this patent:

UNITED STATES PATENTS

| Number | Name | Date |
| --- | --- | --- |
| 1,985,251 | Hayes | Dec. 25, 1934 |
| 2,005,741 | Hayes | June 25, 1935 |
| 2,014,413 | Pierce | Sept. 17, 1935 |
| 2,063,949 | Pierce | Dec. 15, 1936 |
| 2,076,330 | Wood et al. | Apr. 6, 1937 |
| 2,142,066 | Eppelsheimer | Dec. 27, 1938 |
| 2,190,666 | Kallmeyer | Feb. 20, 1940 |
| 2,249,835 | Lakatos | July 22, 1941 |
| 2,350,029 | Glass | May 30, 1944 |
| 2,380,931 | Batchelder | Aug. 7, 1945 |

FOREIGN PATENTS

| Number | Country | Date |
| --- | --- | --- |
| 307,495 | Great Britain | June 2, 1930 |